UNITED STATES PATENT OFFICE.

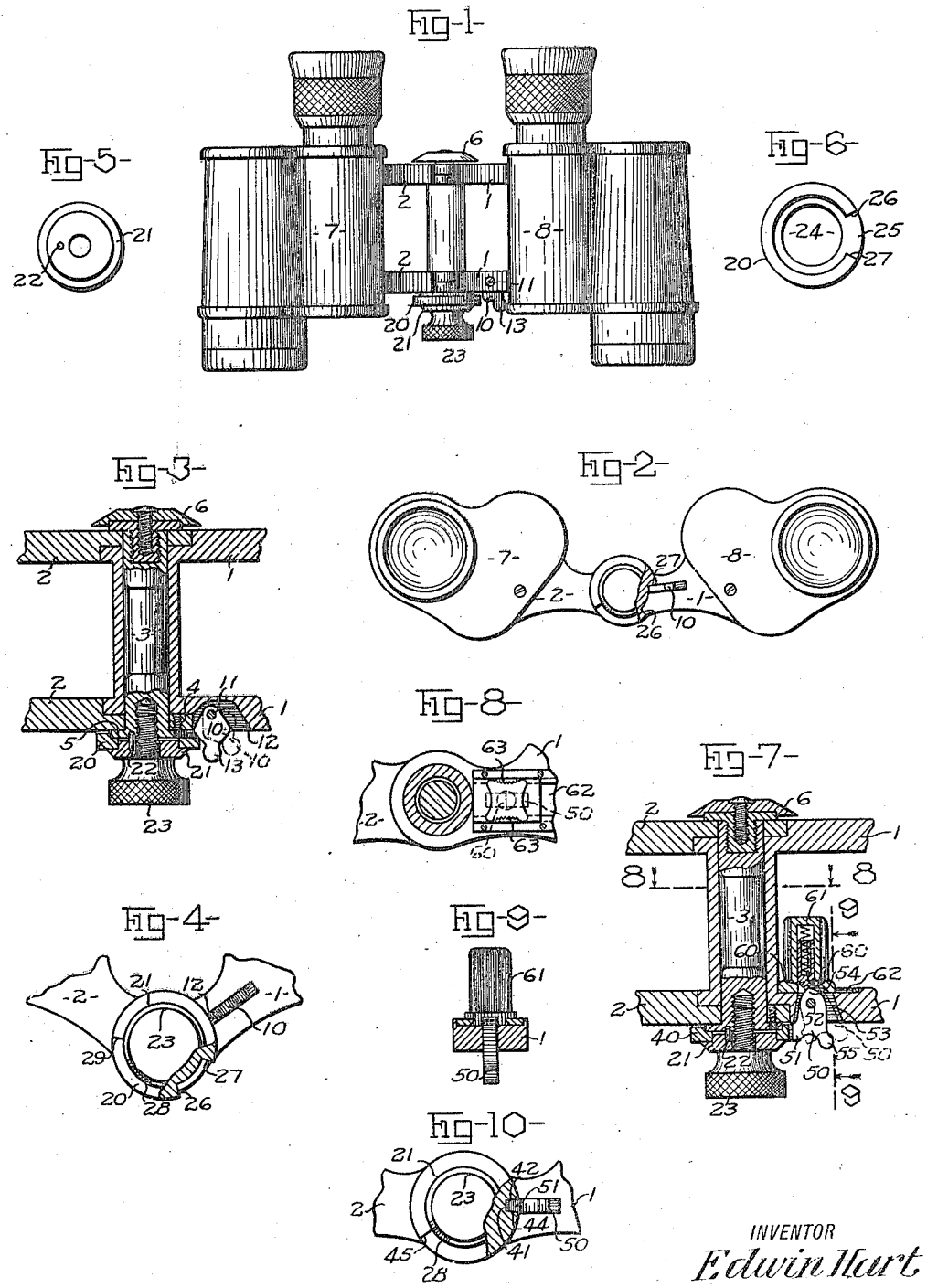

EDWIN HART, OF ROCHESTER, NEW YORK, ASSIGNOR TO BAUSCH & LOMB OPTICAL COMPANY, OF ROCHESTER, NEW YORK, A CORPORATION OF NEW YORK.

INTERAXIAL-DISTANCE STOP FOR BINOCULAR OPTICAL INSTRUMENTS.

1,233,350.                    Specification of Letters Patent.          Patented July 17, 1917.

Application filed August 7, 1916. Serial No. 113,434.

*To all whom it may concern:*

Be it known that I, EDWIN HART, a citizen of the United States, residing at Rochester, in the county of Monroe, State of New York, have invented certain new and useful Improvements in Interaxial-Distance Stops for Binocular Optical Instruments; and I do declare the following to be a full, clear, and exact description of the same, reference being had to the accompanying drawings, forming a part of this specification, and to the characters of reference marked thereon.

My invention relates to optical instruments and more particularly relates to means for gaging the inter-axial distance of hinged binocular instruments.

Objects of the present invention are: to provide a device for gaging and indicating a predetermined inter-axial distance in hinged binocular instruments that is at once convenient, reliable and positive in use; to provide an inter-axial distance stop or lock that may be accurately and conveniently set or adjusted either by trial or by measurement; and to provide a stop or lock of this character that is adapted to be readily thrown into or out of action without interfering with its adjustment.

In the drawings:

Figure 1 is an elevation of a hinged binocular telescope, to the hinge of which has been applied one embodiment of my invention.

Fig. 2 is a vertical section of the hinge and hinge arms of the telescope shown in Fig. 1, showing a manner in which my invention may be applied thereto.

Fig. 3 is an under plan view of Fig. 1, part of the adjusting head and stop plate being broken away to more clearly disclose the coöperation of the stop plate and the stop lever.

Fig. 4 is a fragmentary portion of Fig. 3 on an enlarged scale showing the stop parts in a disengaged position and the hinged arms closed together approximately to their limit of movement.

Fig. 5 is a detail view of the clamping ring alone.

Fig. 6 is a similar view of the stop plate.

Fig. 7 is a vertical section of the hinge structure shown in Fig. 2 embodying my invention in a form adapted simultaneously to gage and lock the instrument.

Fig. 8 is a section taken on the line 8—8 of Fig. 7 looking in the direction of the arrows and showing the stop lever mechanism and contiguous portions in this elevation.

Fig. 9 is a section of the line 9—9 of Fig. 7 looking in the direction of the arrows and showing the stop lever and its actuating mechanism in this elevation.

Fig. 10 is an under plan view of Fig. 7 portions of the adjusting head and stop plate being broken away to show the locking and gaging engagement of the stop lever with the stop plate.

Like characters of reference throughout the drawings indicate the same parts.

A frictional clamp may be provided for setting the desired inter-axial distance of the oculars of a hinged binocular telescope but such a device is often highly inconvenient when the instrument is placed in its carrying case or when one observer desires to loan the telescope for use by another. A mere positive stop when used for gaging the inter-axial distance, is subject to almost the same inconvenience that characterizes the frictional clamping device due to its limiting effect on the movement of the hinge, and while a yielding stop is more convenient and permits of changing the inter-axial distance without destroying the normal adjustment of the stop, yet a device of this type is not sufficiently reliable and accurate to be wholly satisfactory.

Since none of these devices are at once positive, reliable and convenient, I prefer to employ a stop lever secured to one of the hinge members and adapted to be thrown into and out of coöperative relation with a recess of a stop plate that is secured to the opposite hinge member.

In carrying out my invention in the embodiment illustrated in Figs. 1 to 6 inclusive, I preferably secure the hinge pin 3 to one of the arms 2 of the telescope by any suitable means such as a screw stud 4. I then provide a clamp plate 21 which is keyed to the hinge pin by means of the dutchman or dowel 22 so as to be movable toward and from the hinge pin head 5 but immovable about the axis of the clamping screw 23 which passes through its center and is threaded into the hinge pin as shown. Between the clamp plate and the head 5 of the hinge pin is held the stop plate 20 which is adapted to be held in any suitable angular relation to the hinge arms 2 by means of the clamping mechanism just described. This stop plate, as best shown in Figs. 2 and 6, is provided with an aperture 24 through which passes the threaded portion of the screw 23 and the dutchman 22 of the plate 21 and at its periphery the clamp plate is provided with an arcuate recess 25 provided with a pair of abutment walls 26 and 27 arranged one at either end thereof. The stop lever 10 is hinged or fulcrumed on a pin 11 within the recess 12 in position to be swung into and out of engagement with the stop plate recess 25 when the stop plate is in position to bring said recess 25 in alinement with the arms 1. The relative positions of the stop lever 10 when in engagement with the recess 25 and when swung out of engagement therewith are best illustrated in Fig. 3, the full lines indicating the stop lever in engagement with the recess of the stop plate and the dot and dash lines indicating it swung out of engagement relatively to said stop plate. The finger piece 13 is formed on the stop lever 10 for swinging it into and out of engagement with the stop plate.

For convenience in setting the stop plate for any new interpupilary distance I provide a stop plate with an interpupilary distance scale which corresponds to the interpupilary distance scale 6 arranged at the opposite end of the hinge and coöperating with an index on the adjacent arm 1. The interpupilary distance scale for the stop plate comprises the scale 28 formed on the beveled surface of the clamp plate 21 and the index 29 adapted to coöperate therewith and formed on the contiguous surface of the stop plate 20 in such a position that when the abutment wall 27 of the stop plate recess abuts the adjacent side of the stop lever 10, as best shown in Fig. 3, the scale 28 and its index will register the interpupilary distance corresponding with that indicated by the scale 6. Obviously however the scale might be formed on the stop plate and the index on the clamp plate if preferred.

Two important features inherent in this embodiment of my interpupilary distance stop described are: first, that considerable latitude of movement of the telescope barrels 7 and 8 about the hinge is permissible without affecting the adjustment of the stop plate and second, when greater movement of the hinge is desired the stop lever may be thrown out of operative relation with the stop plate when the hinge movement will be as completely unaffected as though no gage stop existed and yet when desired, the stop lever may be returned to coöperative relation with the stop plate and the gage stop will again be in proper adjustment for use. Thus for all such ordinary variations of interpupilary distance as occur when taking the binoculars from their cases and placing them before the eyes it is merely necessary to turn the barrels about their hinge until the stop lever collides with the wall 27 of the stop plate when the correct interpupilary distance is established and when returning the glasses to the case it is merely necessary to move them about their hinge in the reverse direction so that the stop lever 10 will occupy a position intermediate the walls 26 and 27. Whenever it is necessary, however, to move the hinge so far in either direction that the stop lever 10 must pass either of the walls 26 or 27 the stop lever 10 is swung back, that is moved to the position shown in Figs. 1 and 4 when the telescope barrels may be turned in either direction about their hinge, to the limit of movement thereof. While any suitable detaining device may be applied to the stop lever 10, I prefer to make said lever fit the recess 12, the hinge pin 11 or both, so closely that it will be frictionally held in the position in which it is set, until moved manually.

A modification of the embodiment of my invention just described, that is adapted to act not only as an interaxial distance stop but as an interaxial distance lock and which embraces also the features that the two relatively movable members of the gaging and locking mechanism may be thrown out of engaging relation and later returned to engaging relation without in the least affecting the interpupilary distance adjustment: is shown in Figs. 7 to 10 inclusive and hereinafter more fully described.

In carrying out my invention in this form when applied to a hinge structure such as that forming a part of the binocular illustrated in Fig. 1, I preferably employ a stop plate 40, Fig. 7, which may be similar in all respects to the stop plate 20 excepting that instead of having a wide recess 25 therein it is provided with a recess or slot 41 cut into its periphery and provided with the outwardly diverging walls 42 and 43, which slot is engaged by the projecting tooth 51 formed on the forward end of the stop lever 50. The stop lever 50 is fulcrumed on the pin 52 within the recess 53 and means are provided for selectively holding the stop lever 50 either into engagement or out of engagement with the stop plate 40. To this end I prefer to cut the recess 53 all the way through the arm 1 and to form a two faced cam 54 on the lever 50. This cam is preferably shaped and arranged with reference to the axis of the fulcrum pin 52 and the tooth 51 as shown in Fig. 7, and with this cam coöperates a shiftable yielding detent which in the present embodiment preferably consists of a sliding, spring pressed pawl 60 carried within the pawl housing 61 which is slidably mounted in the slideway 62, formed in the inner side of the arm 1 in alinement with the recess 53, as well shown in Figs. 7, 8 and 9. The pawl 60 may be provided either with a chisel edged or with conical end which coöperates with the left hand face of the cam 54 (as viewed in Fig. 7) to hold the tooth 51 of the stop lever 50 into engagement with the slot 41 when the cam housing is in the position shown in Figs. 7 and 8 and, when the cam housing is shifted from this position to a position at the other end of the slideway 62 that will bring the pawl 60 in the position in which it is shown in dot and dash lines in Fig. 7, the stop lever 50 will spring back out of engagement with the stop plate 40 and will assume a position such as is shown in dot and dash lines in Fig. 7. For convenience in moving the pawl housing a pair of finger gripping surfaces 63 are provided on opposite sides of the housing. The scale 28 and the index 45 are arranged relatively to the index 6 so that when the tooth 51 of the stop lever and the slot 41 of the stop plate 40 are in engagement, the interpupilary distance indicated by the index 28 and the scale 45 will correspond to that indicated by the scale 6. With this form of gage stop the lever 50 is adapted to be disengaged from the slot 41 by pressure of the finger on the extension 55 of the stop lever 50 when the hinge may be turned freely and the face of the tooth 51 permitted to rest against the periphery of the stop plate 40. This however may be also accomplished by shifting the pawl housing outwardly, then bending the hinge and returning the pawl housing to the position shown in Fig. 7 when the face 51 of the stop lever will rest against the periphery of the stop plate 40. However, as soon as the slot 41 and the stop lever 50 are brought into alinement, the tooth will spring into locking engagement with the slot 41 thus locking the hinge arms relatively to one another. Obviously, in this latter modification also, the stop lever may be thrown out of engagement with the stop plate for an indefinite period of time after which it may be returned into engagement therewith, without effecting the distance adjustment established by the setting of the stop plate 40.

Having thus described my invention what I claim and desire to secure by Letters Patent of the United States is:

1. The combination with the hinge of an optical instrument including a pair of hinged members, of a pair of stop engaging elements movable with one of the hinged members of the instrument and a coöperating stop member movable with the other hinged member and adapted to be selectively shifted into position to rigidly engage with said stop engaging elements or out of such position.

2. The combination with the hinge of an optical instrument including a pair of hinged members, of a stop member movable with one of the hinged members of the instrument and a stop plate provided with a pair of abutment walls, adjustably secured to the other hinged member, said abutment walls being adapted to rigidly engage with the stop member to set the inter-axial distance of said hinged members and being spaced apart to permit a limited movement of the stop member therebetween.

3. The combination with the hinge of an optical instrument including a pair of hinged members, of a pair of stop engaging elements movable with one of the hinged members of the instrument, a rigid stop movable with the other hinged member and adapted selectively, to be yieldingly held into or out of rigid engagement with said stop engaging elements.

4. The combination with the hinge of an optical instrument including a pair of hinged members, of a stop member movable with one of the hinged members of the instrument and a stop plate provided with a pair of abutment walls, adjustably secured to the other hinged member, said abutment walls being adapted to rigidly engage with the stop member to set the interaxial distance of said hinged members and being spaced apart to permit a limited movement of the stop member therebetween, and a scale and an index for determining the adjustment of the stop plate and setting the interaxial distance.

5. The combination with the hinge of an optical instrument including a pair of hinged members, of a stop member movable with one of said hinged members, a stop plate adjustably secured to the other hinged member and provided with a pair of abutment walls adapted to coöperate with the stop member, and a scale and an index arranged, one on the stop plate and the other in fixed relation to the last named hinged member, and coöperating to indicate the setting of the stop plate.

EDWIN HART.

Witnesses:
WILLIAM G. WOODWORTH,
GEORGE A. PAGE.

Copies of this patent may be obtained for five cents each, by addressing the "Commissioner of Patents, Washington, D. C."